Feb. 2, 1971      G. H. STUDTMANN      3,560,834

CONSTANT VOLTS-PER-HERTZ REGULATING SYSTEM

Filed Dec. 26, 1968      3 Sheets-Sheet 1

Inventor
George H. Studtmann
By James J. Jennings Jr.
Attorney

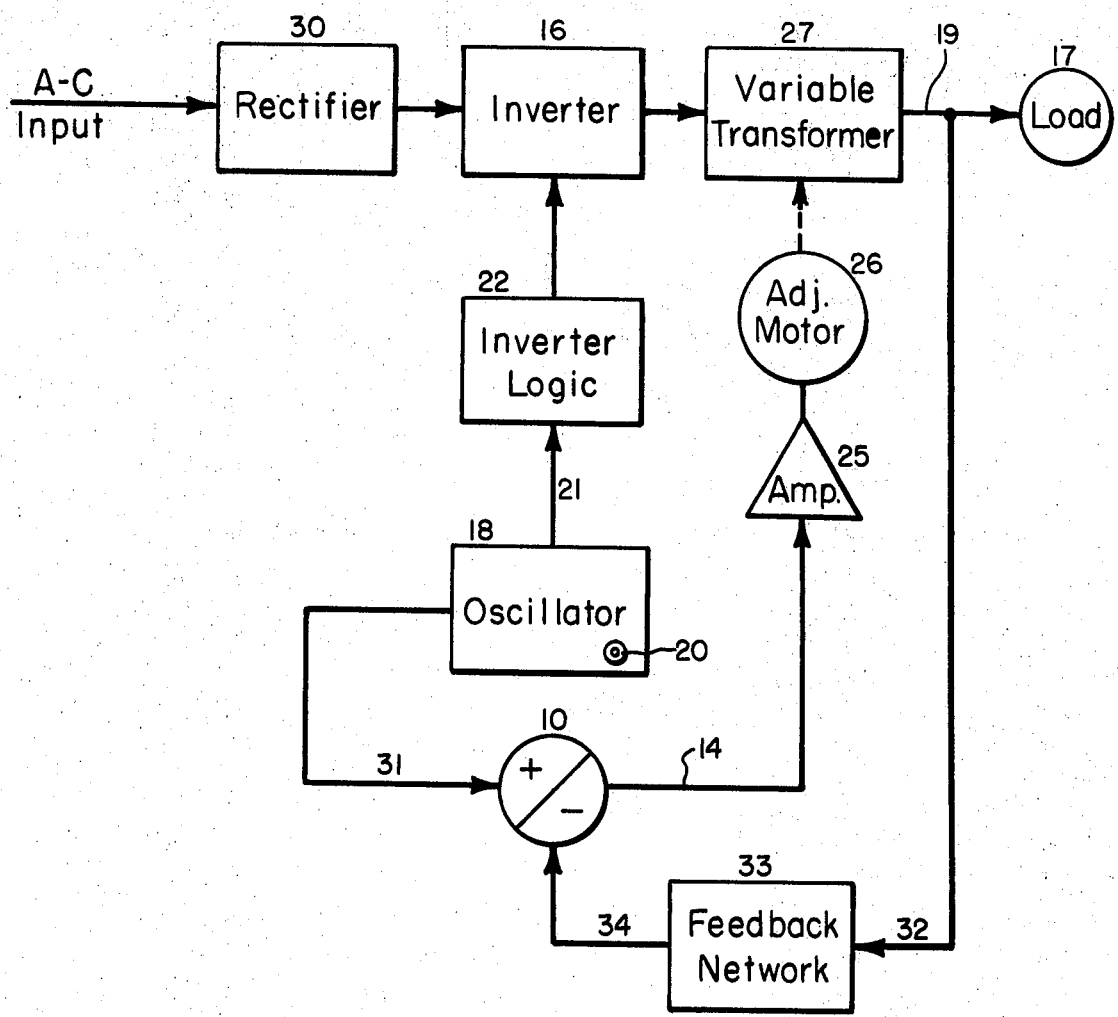

United States Patent Office 3,560,834
Patented Feb. 2, 1971

3,560,834
CONSTANT VOLTS-PER-HERTZ REGULATING SYSTEM
George H. Studtmann, Mount Prospect, Ill., assignor to Borg-Warner Corporation, Chicago, Ill., a corporation of Delaware
Filed Dec. 26, 1968, Ser. No. 786,908
Int. Cl. H02p 5/40
U.S. Cl. 321—4      14 Claims

ABSTRACT OF THE DISCLOSURE

An oscillator applies timing signals to an inverter logic arrangement for governing the frequency of the inverter output A-C voltage supplied to a motor. The amplitude of the A-C voltage applied to the motor is adjusted by suitable control means which receives a regulating signal from a comparator. A first signal channel includes a feedback network, and applies to the comparator a first control signal which indicates the effective amplitude of the inverter voltage. A second signal channel is connected between the oscillator and the comparator to provide a second control signal related to the frequency of the oscillator output. The comparator output signal is a function of both amplitude and frequency, and drives the control means to maintain a preset ratio between amplitude and frequency of the A-C voltage passed to the motor.

BACKGROUND OF THE INVENTION

To operate an induction motor or other inductive load over a wide speed range without saturation and attendant high currents which cause overheating, it is generally desired to maintain a predetermined fixed ratio between the amplitude and the frequency of the voltage passed from the inverter or other unit which energizes the motor. The term "amplitude," as used in this explanation and in the appended claims, broadly refers to the magnitude of that parameter of interest in the control of the electrical motor. In general the half-wave average value of the voltage is observed to avoid the problem of saturation in the motor windings. Conventionally such operation, with a predetermined fixed amplitude/frequency ratio, is termed "constant volts-per-cycle" operation.

There are various approaches to the design of such a system to maintain the volts-per-cycle ratio constant. By way of example it is possible to utilize a converter which receives both an amplitude-related signal and a frequency-related signal (which may actually be a train of pulses such as that supplied to the inverter logic circuit), which converter provides an output signal representing a voltage amplitude/frequency ratio. This ratio-denoting signal is applied to one side of a comparator, which also receives another input signal representing the desired amplitude/frequency ratio from a reference unit. A controller regulated by the output signal from the comparator adjusts the inverter D-C input voltage in the appropriate direction to maintain a constant ratio between the amplitude and frequency of the output voltage passed from the inverter to the motor. A significant shortcoming of such a system is the complexity and expense of the circuitry in the converter requisite to receive and compare the amplitude and frequency signals, and supply the appropriate regulating signal to the comparator.

It is therefore a principal consideration of this invention to provide a constant volts-per-cycle regulating system with simple, inexpensive circuits which obviate the need for costly and complex converter type circuits.

SUMMARY OF THE INVENTION

A control system constructed in accordance with the present invention is useful in a system which maintains a substantially constant amplitude/frequency ratio in the A-C voltage passed from an inverter to an electrical motor. Means, such as input conductors, is connected to provide a D-C voltage for energizing the inverter. An oscillator circuit is connected to provide a series of timing pulses to regulate the frequency of the A-C voltage. In accordance with this invention, a comparator includes an output connection for providing a regulating signal, and also includes first and second input connections. A first signal channel is coupled between the first comparator input connection and the inverter. The first signal channel includes circuit means connected to provide a first control signal related to the amplitude of the A-C voltage. A second signal channel is coupled between the second comparator input connection and the oscillator, for providing a second control signal related to the frequency of the A-C voltage. Thus the comparator applies to appropriate regulating signal to a voltage control circuit, which is connected to adjust the level of the motor-energizing A-C voltage and thus maintain the desired amplitude/frequency ratio of the A-C voltage passed from the inverter to the motor.

Should deviation from the constant amplitude/frequency ratio be desired over any portion of the operating range, such as "voltage boost" when a motor is operated over the low frequency portion of the range, this can readily be accomplished by providing a suitable compensating signal to the comparator.

THE DRAWINGS

In the several figures of the drawings like reference numerals identify like elements, and in the drawings:

FIG. 7 is another block diagram depicting a different control system for practice of the present invention.

GENERAL SYSTEM DESCRIPTION

Figure 1:
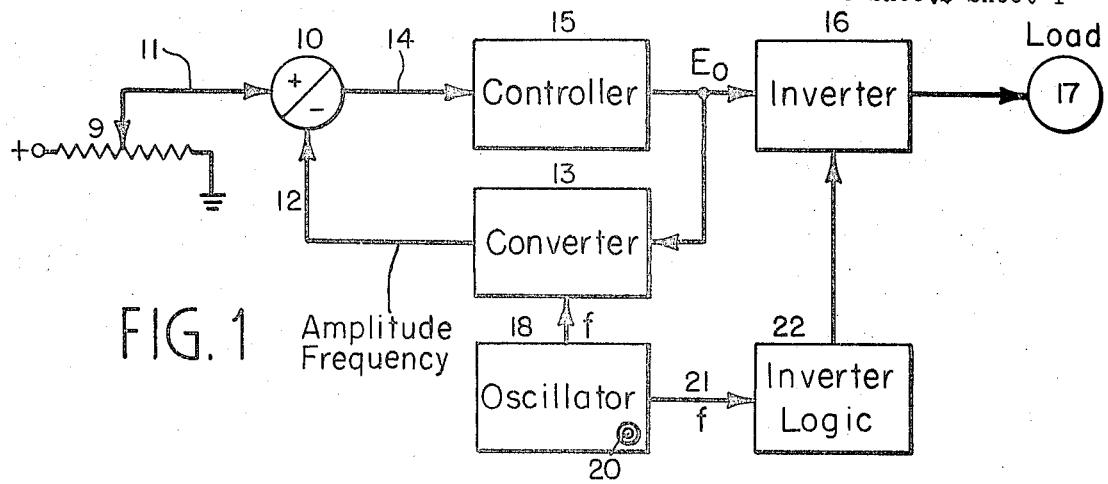
FIG. 1 is a block diagram depicting a known constant volts-per-cycle control system.

There are various approaches to the design of a constant volts-per-cycle regulator system. One general arrangement is shown in FIG. 1, wherein a comparator stage 10 receives a fixed reference signal indicating a first amplitude/frequency ratio over line 11, and receives a second signal, connoting a second amplitude/frequency ratio, over line 12. This second signal, provided at the output side of a converter 13, represents the ratio of actual voltage amplitude with respect to frequency. The output regulating signal of the comparator 10 is applied over line 14 to the input side of a controller 15, which is effective to provide a D-C output voltage $E_0$ to energize an inverter 16. In turn the inverter supplies an A-C voltage to operate a load 17 such as an induction motor. The voltage $E_0$ supplied to the inverter is also applied to one input connection of converter 13, which also receives another input signal from an oscillator 18. This other input signal is related to the frequency (adjustable by knob 20) of timing pulses supplied by the oscillator over another line 21 to an inverter logic arrangement 22. In turn the logic arrangement 22 is effective to regulate the switching of the semi-conductors within inverter 16 at a rate determined by the frequency of the timing pulses supplied by the oscillator. Those skilled in the art will appreciate that although the inverter logic arrangement 22 is illustrated as a separate unit, the logic or pulse distribution and control arrangement can be incorporated in the same housing as that which encloses the inverter 16, or in the oscillator unit. A major drawback of systems such as that shown in FIG. 1 is the complexity and expense of the converter unit, which must receive input signals related to the voltage amplitude and to the oscillator frequency, and provide an output signal denoting the ratio of voltage amplitude with respect to frequency for application to comparator 10.

In prior art systems for maintaining a constant amplitude/frequency ratio, it has been common practice to employ a reference component such as the potentiometer 9 at the left side of FIG. 1 to provide a fixed signal connoting the desired volts-per-cycle ratio. This derived signal can be supplied from the potentiometer, or from another adjustable reference unit. The reference signal denotes the desired volts/Hertz ratio, and the other signal applied over line 12 to the comparator indicates the existing amplitude/frequency ratio of the voltage supplied to the motor. It is the conventional practice of providing the ratio-indicating signal that leads to the complexity and expense of the known control systems employing a converter.

A significant part of the present invention includes the appreciation that this prior art system of comparing two ratio-indicating signals need not be slavishly followed. By providing a signal from oscillator 18 related to the oscillator frequency by some constant, this signal itself can be utilized in accordance with this invention as a floating reference signal. This avoids the need for a ratio-indicating reference signal as utilized in FIG. 1. Further, by providing a second signal related to the inverter voltage and algebraically combining this with the first signal related to the oscillator frequency, an error signal can be simply provided from the comparator. Note that the second signal likewise is not related to a ratio but only to a voltage magnitude; hence a simple feedback network can provide this signal. The error signal may then be applied to any suitable voltage control circuit to provide the appropriate inverter voltage, and thus the requisite regulation of the A-C voltage passed to the motor is achieved without the necessity of providing a ratio-indicating signal.

Figure 2:
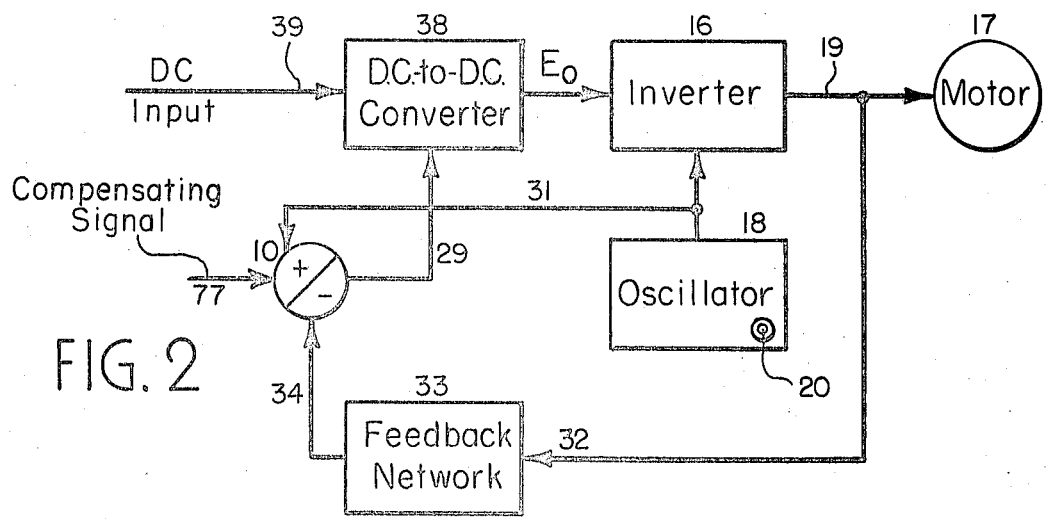
FIG. 2 is a block diagram illustrating a constant volts-per-cycle control system in accordance with this invention.

A system intercoupled in accordance with the inventive teaching is shown in FIG. 2, illustrating the relative simplicity in terms of hardware as contrasted to previously employed systems utilizing a converter. As one type of controller, a D-C-to-D-C converter 38 is shown energized over line 39 and provides the output voltage $E_0$ to energize inverter 16. The output connection of comparator 10 provides a regulating signal over the converter 38 to regulate the amplitude of $E_0$. Those skilled in the art will appreciate that such regulating means can also comprise pulse width modulation or other control arrangements coupled in the inverter itself, to regulate the amplitude of the inverter output voltage, instead of an external voltage control circuit. Other control arrangements, such as a variable transformer coupled with rectifiers, phase controlled A-C-to-D-C rectifier supplies, and similar forms of voltage controllers well known to those skilled in the art can be employed in place of the D-C-to-D-C converter when the prime source of energy is an A-C source, to regulate the output level of $E_0$ in accordance with the regulating signal received over line 29. One such arrangement, and the transposition of the voltage control circuit to the output side of the inverter, or to the inverter itself, will be illustrated and explained below.

In accordance with the inventive teaching, one signal channel represented by line 31 is coupled between oscillator 18 and a first input connection of the comparator, to provide a first control signal related to the frequency of the A-C voltage passed to the motor 17. A second signal channel is coupled between the output side of the inverter and the second input connection of the comparator, providing over line 34 a second control signal related to the amplitude of the A-C voltage applied to the motor. A portion of the A-C voltage from the inverter is passed over line 32 to a feedback network 33, to provide a second control signal. This feedback circuit may include rectifiers, transformers, gain or attenuation, filtering, or other conventional components, but it does not require the complex circuitry required by converter 13 in FIG. 1 because a ratio-denoting signal is not provided in the system of FIG. 2. The output signal from feedback network 33 is applied over line 34 to the second input connection of comparator 10. In this way the requisite amplitude/frequency ratio is maintained without providing a first derived ratio-indicating signal as a reference, and without the necessity of producing a second ratio-depicting signal related to the instantaneous volts-per-cycle ratio of the A-C voltage then being applied to the motor.

Figure 3:
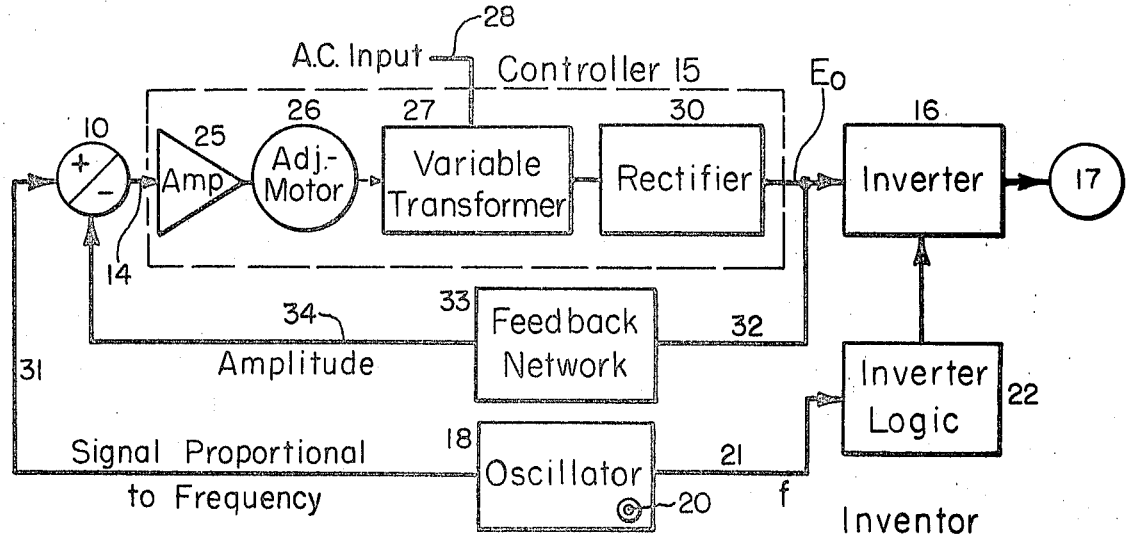
FIG. 3 is a block diagram of another control system illustrating a different voltage control arrangement.

Another system intercoupled in accordance with the inventive teaching is shown in FIG. 3, further illustrating the relative simplicity in terms of hardware for implementation of the inventive system. Controller 15 is shown as including an input amplifier 25 for receiving a signal over line 14 from the comparator 10, and for passing the amplified control signal to an adjusting motor 26 which in turn drives a variable transformer 27 in a well known manner to determine what portion of an A-C input voltage received over line 28 is passed to rectifier circuit 30. This in turn regulates the level of the D-C voltage passed from the output side of the rectifier circuit 30 to energize the inverter 16. The variable transformer can of course be any adjustable component, such as a Variac unit, which includes a mechanically adjustable portion for regulating an output A-C voltage as a function both of received A-C input voltage and the mechanical setting of the unit. All the components illustrated within controller 15 are generally similar to the arrangement in any such controller, including that of FIG. 1.

The system of FIG. 3 includes a first signal channel, shown coupled between inverter 16 and a first input connection of comparator 10. This first channel includes line 32 for passing a signal related to voltage $E_0$ to the input side of a feedback circuit 33. The feedback network passes a first control signal, which is a function of the amplitude of $E_0$, over line 34 to the first input connection of comparator 10.

The system of FIG. 3 also includes a second signal channel, represented by line 31, for passing a second control signal to the second input connection of comparator 10. This second control signal is proportional to the frequency of the oscillator signal passed over line 21 to the inverter logic circuit. Some oscillator circuits are now available which themselves provide an output series of pulses of a frequency related to the level of a D-C input control signal applied to the oscillator. Such a voltage-controlled oscillator (VCO) further simplifies practice of the invention because the signal proportional to the frequency need not be derived from the oscillator circuit, but a portion of the oscillator control signal can itself be applied directly over line 31 to the comparator circuit. If a VCO unit is not employed the requisite second D-C control signal, proportional to frequency, can be simply provided as will be shown hereinafter in connection with FIGS. 4 and 5.

Figure 4:
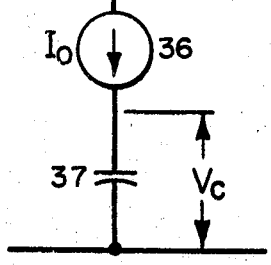
FIG. 4 is an illustrative showing.

One technique for providing a signal proportional to frequency over line 31 is shown in FIG. 4. A constant current source 36 is connected to apply a constant charging current $I_0$ to a capacitor 37, such that the capacitor accumulates a charge and acquires a voltage $V_c$. The expression for this voltage is $$V_c = \frac{I_0}{C} t$$

In this expression $t$ represents the time duration during which the charging current is applied. Assuming that the voltage $V_c$ developed across capacitor 37 will be utilized to fire a trigger device at some reference voltage $V_t$, the period of oscillation T for the simplified arrangement of FIG. 4 is given by $$T = \frac{V_t C}{I_0}$$

The frequency $f$ is inversely related to the period T, so that $$f = \frac{I_0}{V_t C}$$

Thus the charging current $I_0$ is proportional to the frequency $f$, and this current (or one derived from this current) can be utilized as the frequency-proportional signal applied over line 31 to the comparator 10 in FIG. 2 or 3.

Figure 5:
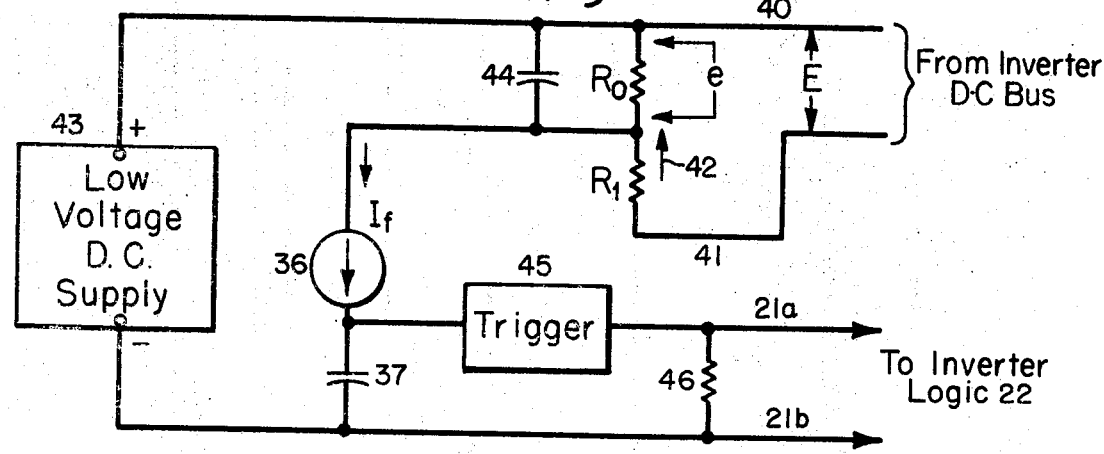
FIG. 5 is a schematic illustration partially in block form, useful in understanding the operation of the inventive system.

Considering the general arrangement of FIG. 5, a direct current voltage E is fed back from the inverter D-C bus over lines 40, 41 and applied across the series circuit including first and second resistors $R_0$ and $R_1$. By making the effective value of resistor $R_1$ very much greater, by at least an order of magnitude, than that of $R_0$, it can be assumed that the current represented by arrow 42 flowing upwardly through these two resistors is essentially the value of E divided by $R_1$. The constant current generator 36 is energized by a suitable voltage provided from the low voltage power supply 43. A filter capacitor 44 is coupled in parallel with resistor $R_0$. A trigger circuit 45 is shown coupled between output conductor 21a and the common connection between constant current source 36 and charging capacitor 37. An output impedance 46 is shown coupled between the output conductors 21a, 21b.

Capacitor 37 is charged as the charging current $I_f$ flows from conductor 40 through resistor $R_0$ and the constant current source 36 through capacitor 37 to conductor 20b. This charging current is proportional to the oscillator frequency, as explained above. The voltage E is proportional to the amplitude of the inverter bus voltage. Thus $e$, the error voltage developed across resistor $R_0$, represents the error voltage output of the comparator 10 applied over line 14. In effect the oppositely-conducted currents through the resistor $R_0$ provide the error signal $e$, which may be expressed $$e = R_0 \left[ I_f - \frac{E}{R_1} \right]$$

assuming $R_1$ is very much larger than $R_0$. Considering A as the proportionality factor (which may not be a constant value over the entire operating range) of the controller 15, when the error signal $e$ is applied to the controller, the inverter bus voltage E is $$E = eA$$

Substituting the expression already developed for $e$, $$E = R_0 \left[ I_f - \frac{E}{R_1} \right] A$$

$$E = R_0 I_f A - E \frac{R_0 A}{R_1}$$

$$E + E \frac{R_0 A}{R_1} = R_0 I_f A$$

$$E \left[ 1 + \frac{R_0 A}{R_1} \right] = R_0 I_f A$$

$$E = \frac{R_0 I_f A}{1 + \frac{R_0 A}{R_1}}$$

In a system where the value of $R_0/R_1$ has a value very much greater than unity, it follows that $$E \doteq \frac{R_0 I_f A}{\frac{R_0 A}{R_1}}$$

Accordingly $E \doteq I_f R_1$. With the constant current device 36 having some constant relationship $K_1$ to the frequency $f$, $$I_f = K_1 f$$

$$E = R_1 I_f$$

$$E = R_1 K_1 f$$

or $$\frac{E}{f} = K_2$$

which is the desired result.

The general arrangement of FIG. 3 and the circuit illustrated in FIG. 5 both depict an arrangement in which the fed back voltage E is derived from the inverter D-C bus 40, 41 at the input side of the inverter. There will of course be a variation in the inverter output voltage as the load 17 is energized from no load to full load condition. Accordingly if it is desired to provide more precise regulation of the volts/Hertz ratio supplied to an induction motor 17, the voltage E can be derived from the A-C output voltage (or a fraction of the output voltage) of inverter 16, and passed over lines 19, 32 to feedback circuit 33. With this arrangement a more precise regulation of the desired volts-per-Hertz ratio of the motor energizing voltage is achieved.

Figure 6:
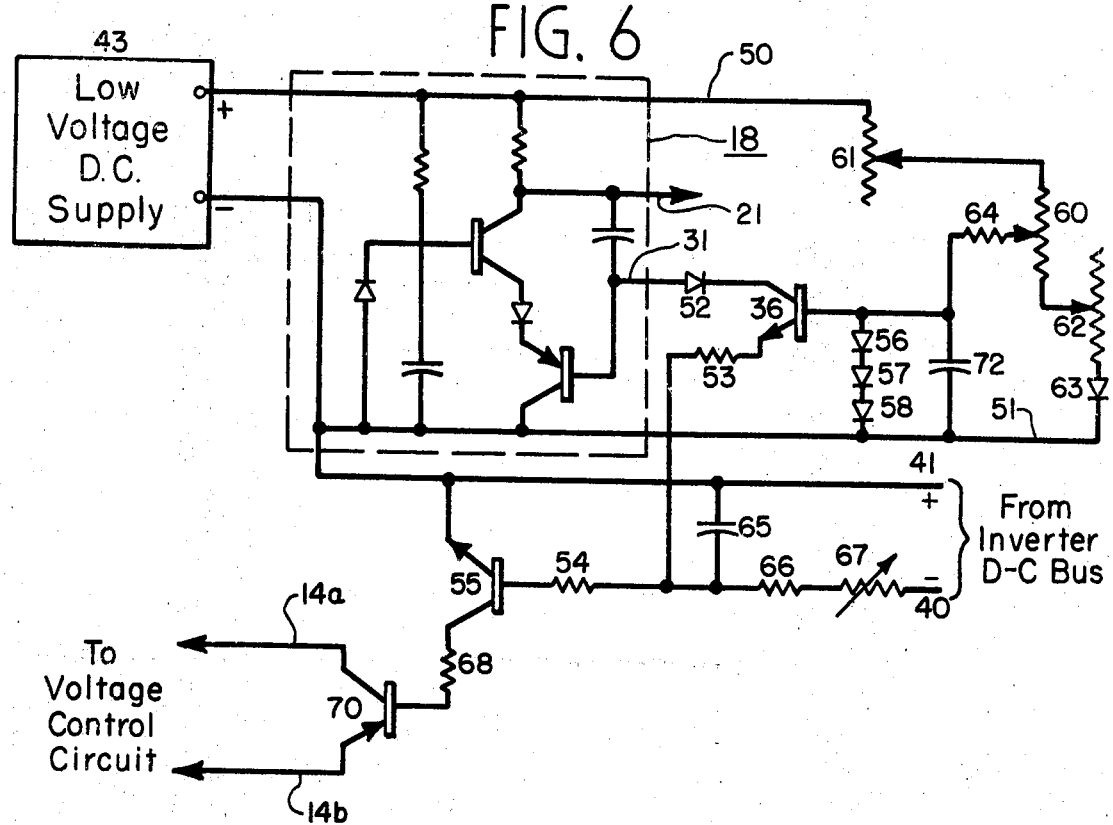
FIG. 6 is a schematic diagram of a preferred arrangement for implementing the present invention.

FIG. 6 depicts one circuit for implementing the invention with a transistor connected as a summing unit to provide the desired output to the controller. As there shown low voltage D-C power supply 43 provides an output potential difference on output conductors 50 and 51, with the potential on conductor 50 being positive with respect to that on conductor 51. This potential difference is connected to energize oscillator circuit 18 and provide an output signal on conductor 31 which is proportional to the frequency of oscillator 18. Various types of oscillators can be utilized, and the one illustrated is described and explained in detail in U.S. Pat. No. 3,406,355, which issued to Anthony Trujillo on Oct. 15, 1968 and is assigned to the assignee of this invention. From that explanation it will be apparent that appropriate timing pulses are provided on line 21 for application to the inverter logic circuit. The output current flowing over conductor 31, diode 52 and through the collector-emitter path of NPN-type transistor 36 is proportional to the frequency of operation of oscillator 18. This current flows from the emitter of transistor 36, through resistors 53 and 54, and through the base-emitter junction of a summing transistor 55 to conductor 41. It is noted that the emitter of transistor 55 is connected to conductor 51, the negative voltage lead from the D-C supply 43, and also to the positive inverter bus conductor 41. Transistor 55 could of course be replaced by an equivalent semiconductor unit having input, common and output terminals in a manner similar to the base, emitter and collector of the transistor.

Other components shown in the upper portion of FIG. 6 include three series-coupled diodes 56, 57 and 58, all coupled between the base of transistor 36 and conductor 51 to provide temperature compensation in the regulating circuit. The frequency-adjusting circuit includes a main adjustment potentiometer 60, with one end portion coupled through a first frequency limit adjustment potentiometer 61 to conductor 50. The other end of main potentiometer 60 is coupled through a series circuit including the effective portion of a second frequency limit adjusting potentiometer 62 and a diode 63 to conductor 51. The movable arm of potentiometer 60 is coupled through a resistor 64 to the base of transistor 36. A capacitor 72 is coupled between the base of transistor 36 and conductor 51. The frequency regulating and temperature compensating portion of the circuit may be revised in many conventional ways, and these components are not requisite to understanding or practice of the invention.

A capacitor 65 is coupled between conductor 41 and the common connection between resistors 53, 54 and 66. A potentiometer 67 is coupled between resistor 66 and conductor 40 to provide regulation of the amount of current produced in the summing circuit for a given level of voltage applied from the inverter D-C bus. This current, related to the level of the voltage on the D-C bus at a given moment, tends to flow from conductor 41 through the base-emitter junction of transistor 55, resistors 54 and 66, and potentiometer 67 to conductor 40. Accordingly the signal related to oscillator frequency opposes that signal related to the inverter voltage in the control portion of transistor 55, such that the net base current and hence the collector current of this semiconductor is a summation or error signal denoting the deviation (if any) from the desired amplitude/frequency ratio. This summing signal from the collector of transistor 55 is applied through a resistor 68 to the base of a PNP-type transistor 70, which provides amplification and impedance matching before passing the desired regulating signal over its collector and emitter leads 14a, 14b to the voltage control circuit.

FIG. 7 illustrates a control system which, like the arrangement of FIG. 3, includes a variable transformer 27 and an adjusting motor 26 which drives the transformer in response to the regulating signal applied from the output side of the comparator. The system of FIG. 7 differs only in that the variable transformer is coupled between the inverter and the load, so that adjustment of the transformer regulates the amplitude of the A-C voltage passed over line 19 to energize the motor. Other voltage control circuits, such as phase-controlled rectifier supplies, can be coupled to the output side of the inverter to regulate the amplitude of the voltage supplied to the load. Such arrangements will be readily apparent to those skilled in the art.

In addition to controllers which function to control either the intput D-C voltage to the inverter or the output A-C voltage from the inverter, there are many control techniques and circuits which are incorporated in the inverter itself and operate to control the amplitude of the voltage passed to the load. Various forms of pulse width modulation circuits can be employed to achieve such control. By way of example, one such circuit is disclosed and claimed in U.S. Pat. No. 3,406,328, "Static Inverter Carrier System," which issued to George H. Studtmann Oct. 15, 1968, and is assigned to the assignee of this invention. The system of this invention is readily adapted for use with such arrangements, for it is not in the voltage control that the present invention resides, but rather in the manner in which the appropriate first and second control signals are derived and supplied to the control arrangement. Such equivalent arrangements will be readily apparent to those skilled in the art.

It is clear that the control system of the present invention achieves significant advantages of economy and simplicity as contrasted to prior art voltage amplitude/frequency ratio control systems by replacing the complex converter unit previously utilized to provide a ratio-indicating signal by a simple feedback circuit. The amplitude-related signal is readily supplied from the feedback network, and the frequency-related signal is provided either directly from the voltage-controlled oscillator, or through a circuit such as shown in FIG. 5 or 6, or various other arrangements known to workers in this art, for mixing in comparator 10 to provide the desired control signal.

What is claimed is:

1. A control system for maintaining a substantially constant amplitude/frequency ratio in the A-C voltage passed from an inverter to an electrical load, including means for providing a D-C voltage for energizing the inverter, and an oscillator circuit connected to provide a series of timing pulses to regulate the frequency of said A-C voltage, wherein the improvement comprises:

comparator means, including an output connection for providing a regulating signal, and first and second input connections;

a first signal channel, connected between said first input connection of the comparator means and the inverter, including circuit means connected to provide a first control signal which varies in response to variations of the amplitude of said A-C voltage;

a second signal channel, connected between said second input connection of the comparator means and the oscillator, for providing a second control signal which varies in response to variations of the frequency of said timing pulses from the oscillator, such that the comparator means provides said regulating signal which includes all the information for maintaining the desired amplitude/frequency ratio of said A-C voltage; and a voltage control circuit, connected to adjust the level of said A-C voltage passed to the load in response to receipt of said regulating signal from the output connection of the comparator means to maintain the desired amplitude/frequency ratio of said A-C voltage.

2. A control system as claimed in claim 1 in which said voltage control circuit includes a DC-to-DC converter connected in the means for providing a D-C voltage to energize the inverter, and circuit means for applying said regulating signal to the DC-to-DC converter to adjust the input D-C voltage which energizes the inverter and thus regulate the amplitude/frequency ratio in said A-C voltage.

3. A control system as claimed in claim 1 in which said voltage control circuit includes an AC-to-DC converter connected in the means for providing a D-C voltage to energize the inverter, and circuit means for applying said regulating signal to the AC-to-DC converter to adjust the input D-C voltage which energizes the inverter and thus regulate the amplitude/frequency ratio in said A-C voltage.

4. A control system as claimed in claim 3 in which said AC-to-DC converter includes a variable transformer coupled between said means for providing a D-C voltage for energizing the inverter and input means for supplying an A-C input voltage to the variable transformer, and an adjusting motor connected to drive said variable transformer responsive to receipt of said regulating signal from the comparator means, to regulate the level of said D-C voltage which energizes the inverter and thus regulate the inverter output voltage to maintain the constant amplitude/frequency ratio in said A-C voltage.

5. A control system as claimed in claim 1 in which said voltage control circuit includes means, coupled between the inverter and the electrical load, for adjusting the level of the A-C voltage passed to the load responsive to receipt of said regulating signal from the comparator means, so that the adjusting means directly regulates the amplitude/frequency ratio in said A-C voltage.

6. A control system as claimed in claim 5 in which the adjusting means includes a variable transformer coupled between the inverter and the electrical load, and an adjusting motor connected to drive the variable transformer responsive to receipt of said regulating signal from the comparator means, so that adjustment of said variable transformer directly regulates the amplitude/frequency ratio in said A-C voltage.

7. A control system as claimed in claim 1 in which said voltage control circuit includes first circuit means, coupled in the inverter for adjusting the level of the inverter A-C output voltage, and second circuit means for applying said regulating signal to the first circuit means to adjust the amplitude of the inverter A-C output voltage and thus regulate the amplitude/frequency ratio in said A-C voltage passed to the electrical load.

8. A control system as claimed in claim 1 in which said first signal channel is coupled between said first input connection of the comparator means and the inverter input circuit over which said D-C voltage for energizing the inverter is received.

9. A control system as claimed in claim 1 in which said first signal channel is coupled between said first input connection of the comparator means and the inverter output connection of the comparator means and the inverter output circuit over which the inverter A-C output voltage is passed to the load.

10. A control system as claimed in claim 1 in which said second signal channel comprises a constant current device, a capacitor coupled in series with said constant current device for charging the capacitor, and a discharge device connected for triggering as said capacitor is charged to a predetermined level to provide regulation of said timing pulses from the oscillator circuit, the magnitude of current flow through said constant current device being proportional to the frequency of said timing pulses such that said current can be utilized as said second control signal.

11. A control system as claimed in claim 1 including means for providing a compensating signal to said comparator means, to afford modification of said constant amplitude/frequency ratio over any desired portion of the system operating range.

12. A control system for maintaining a substantially constant amplitude/frequency ratio in the A-C voltage passed from an inverter to an electrical load, including means for providing a D-C voltage to energize the inverter, and an oscillator circuit connected to provide a series of timing pulses to regulate the frequency of said A-C voltage, wherein the improvement comprises:

a first signal channel, including a first resistor coupled in series with a constant current device connected to produce a first current flow proportional to the frequency of said A-C voltage, and means for energizing said first signal channel;

a second signal channel, including a second resistor coupled in series with said first resistor, said second resistor having a resistance value at least an order of magnitude greater than the resistance value of said first resistor, and means for energizing the series circuit including said first and second resistors with a D-C voltage proportional to the amplitude of said A-C voltage and of a polarity to cause current flow through said first resistor in a direction opposite to the direction of said first current flow, so that the net voltage across said first resistor is a control voltage signifying the extent and direction of deviation from said constant amplitude/frequency ratio;

a voltage control circuit connected to receive said control voltage and to regulate the amplitude of said A-C voltage supplied to the electrical load; and means, coupled between said first signal channel and the oscillator, for regulating the oscillator frequency as a function of the level of said first current flow.

13. A control system as claimed in claim 12 in which said means for regulating the oscillator frequency includes a capacitor coupled in series with said constant current device in the first signal channel to accumulate a voltage as a function of the frequency of said A-C voltage, and said oscillator includes a trigger circuit, coupled to a point between said constant current device and said capacitor, for regulating the frequency of said A-C voltage in accordance with the level of the voltage accumulated across said capacitor.

14. A control system for maintaining a substantially constant amplitude/frequency ratio in the A-C voltage passed from an inverter to an electrical load, including means for providing a D-C voltage for energizing the inverter, and an oscillator circuit connected to provide a series of timing pulses to regulate the frequency of said A-C voltage, wherein the improvement comprises:

a comparator circuit, including a semiconductor unit having input, common and output elements connected to operate as a comparator by algebraically summing currents which tend to oppose each other in the input-common portion of the semiconductor unit;

a first signal channel, comprising circuit means coupled between said inverter and the input and common portions of said semiconductor unit, for applying a first signal tending to cause current flow in a first direction through the input-common portion of said semiconductor unit;

a second signal channel, including a second semiconductor unit connected as a constant current device and coupled between said oscillator and the input-common portion of said first semiconductor unit, for applying a second signal proportional to the frequency of oscillator operation to said first semiconductor unit, which second signal tends to cause current flow through the input-common portion of the first semiconductor unit in a direction opposite said first direction such that the current flow through the output element of said first semiconductor unit denotes both the extent and the direction of any deviation from the desired amplitude/frequency ratio;

means for energizing said first semiconductor unit; and a voltage control circuit connected to receive the output signal from the output element of said first semiconductor unit and to adjust the level of said A-C voltage passed to the load, thus maintaining the preset amplitude/frequency ratio.

References Cited
UNITED STATES PATENTS 3,351,835   11/1967   Borden et al. _____ 318—230

FOREIGN PATENTS 745,840   3/1956   Great Britain _____ 318—231

WILLIAM H. BEHA, Jr., Primary Examiner

U.S. Cl. X.R.

318—230, 231